(12) United States Patent
Fujikawa

(10) Patent No.: US 6,857,126 B2
(45) Date of Patent: Feb. 15, 2005

(54) OBJECTIVE LENS DRIVING APPARATUS WITH REINFORCING RIB AND RESTRAINING PART FOR FOCUSING COIL OR TRACKING COIL

(75) Inventor: Yasuo Fujikawa, Tokushima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 399 days.

(21) Appl. No.: 10/049,179

(22) PCT Filed: Jul. 19, 2001

(86) PCT No.: PCT/JP01/06312
§ 371 (c)(1),
(2), (4) Date: Feb. 8, 2002

(87) PCT Pub. No.: WO02/09101
PCT Pub. Date: Jan. 31, 2002

(65) Prior Publication Data
US 2002/0105898 A1 Aug. 8, 2002

(30) Foreign Application Priority Data
Jul. 24, 2000 (JP) ........................................ 2000-222321

(51) Int. Cl.[7] ............................ G11B 7/08; G11B 7/085; G11B 7/09

(52) U.S. Cl. ...................................................... 720/683
(58) Field of Search ................................. 720/685, 683, 720/658, 672, 674, 681, 682; 359/819; 369/244, 244.1

(56) References Cited

U.S. PATENT DOCUMENTS

2002/0093888 A1 * 7/2002 Higashihara et al. .... 369/44.21

FOREIGN PATENT DOCUMENTS

| JP | Hei 5-342607 | 12/1993 |
| JP | 07-176063 | 7/1995 |
| JP | 09/161287 | 6/1997 |

* cited by examiner

Primary Examiner—Julie Anne Watko
(74) Attorney, Agent, or Firm—Sheridan Ross P.C.

(57) ABSTRACT

To provide an inexpensive and easily manufaturable objective lens driving apparatus. It has a configuration wherein a reinforcing rib part for reinforcing a coil restraining part of a support printed board is formed on a lens holder and ends of windings of a focusing coil and a tracking coil are wound around the support printed board and the reinforcing rib part in bundle for restraining.

4 Claims, 14 Drawing Sheets

Suspension wire

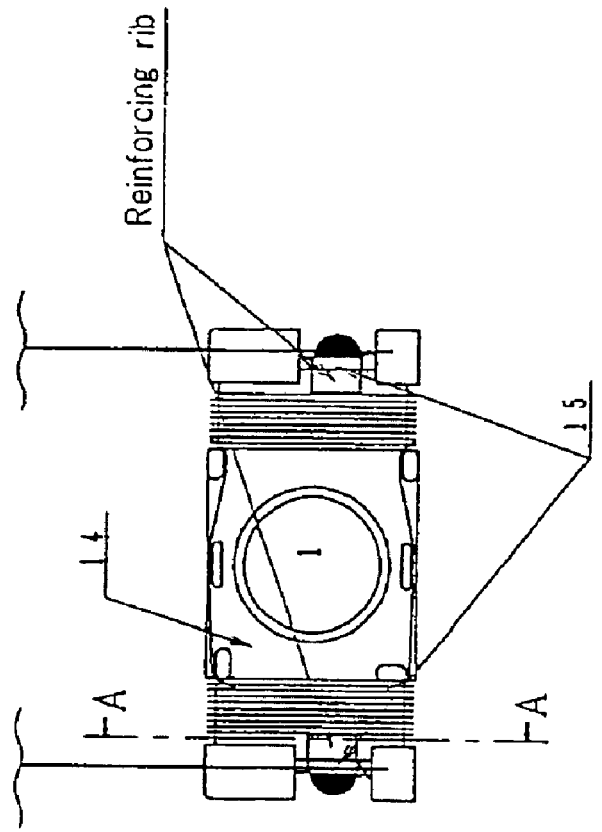
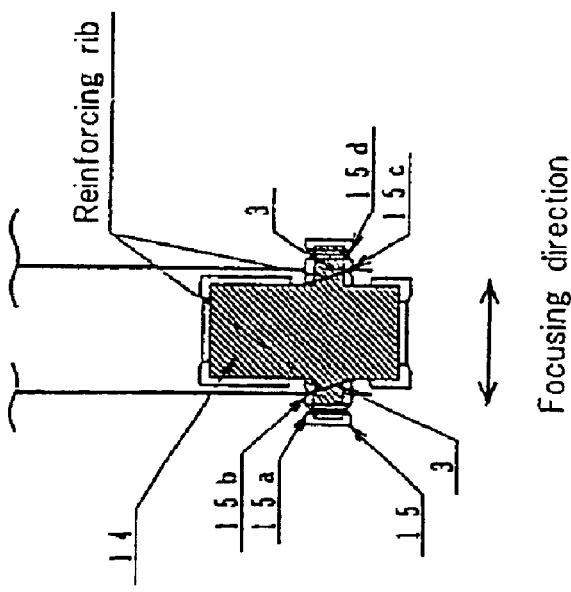

A-A sectional view

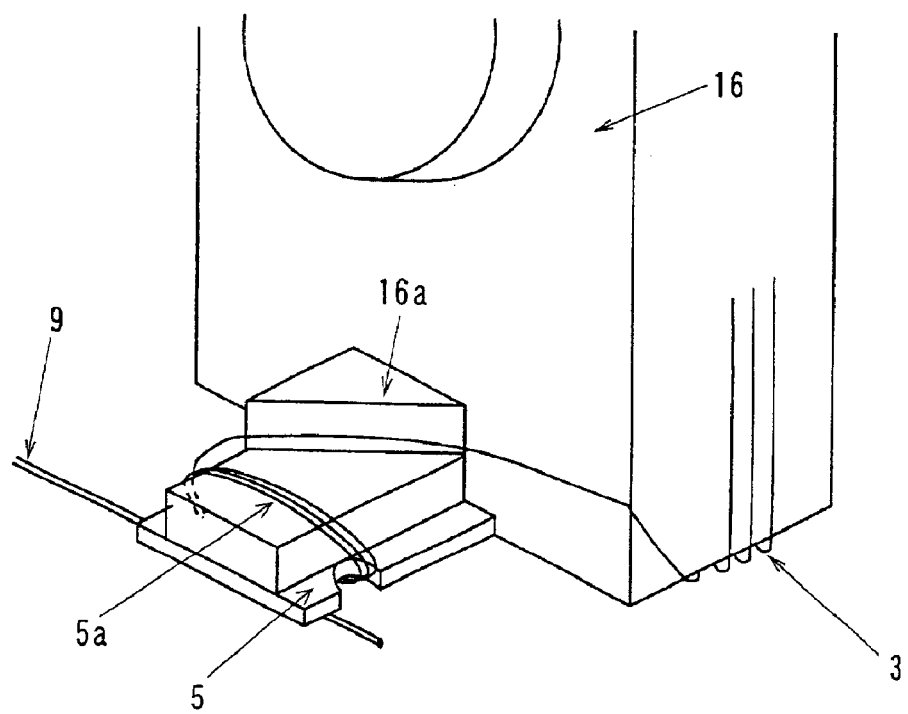
F I G. 7

FIG. 11 (a)
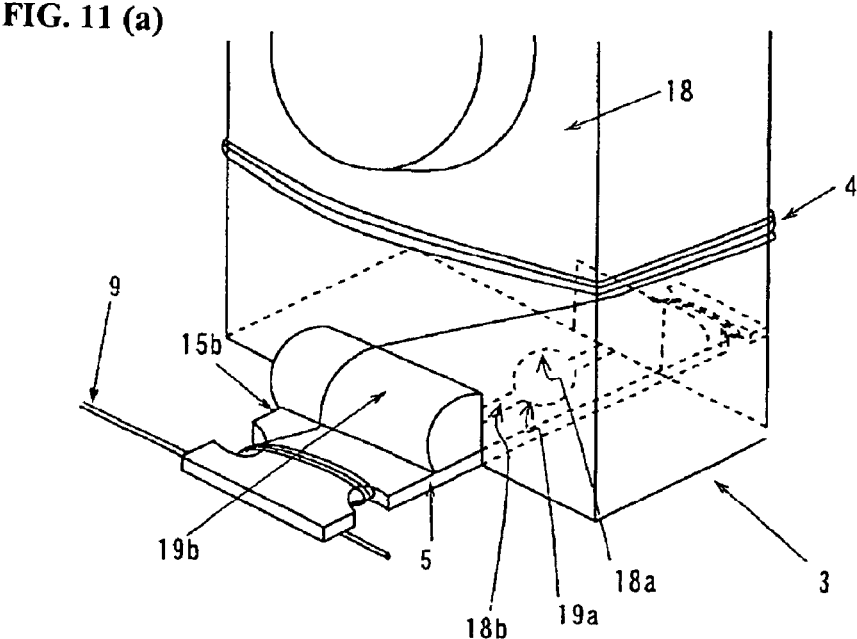
FIG. 11 (b)
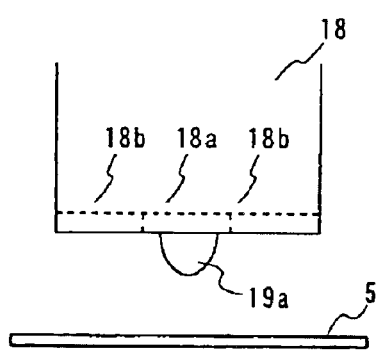
FIG. 11 (c)
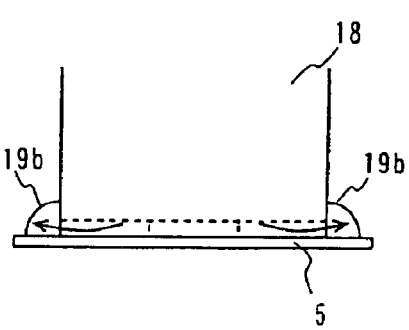

OBJECTIVE LENS DRIVING APPARATUS WITH REINFORCING RIB AND RESTRAINING PART FOR FOCUSING COIL OR TRACKING COIL

TECHNICAL FIELD

This invention relates to an objective lens driving apparatus for driving an objective lens in response to an applied control signal and performing focusing and tracking with respect to an optical data recording medium and its manufacturing method.

BACKGROUND ART

These days, optical disk apparatus (e.g. DVD disk apparatus) that mounts an optical pickup (including an objective lens) for recording a signal onto or reproducing a signal from an optical data record medium (e.g. optical disk such as DVD disk) is now in increasing demand.

These optical disk apparatus have an objective lens driving apparatus for driving an objective lens in response to a control signal and performing focusing control and tracking control.

This invention relates to an objective lens driving apparatus, and particularly to the configuration of a support printed board and its periphery for restraining the ends of windings of a focusing coil or a tracking coil of the objective lens driving apparatus.

An Official Gazette of Japanese Laid-open Public Patent Application Hei 5-342607 describes a conventional objective lens driving apparatus having a support printed board for restraining the ends of windings of a focusing coil or a tracking coil.

The configuration will be explained hereinafter.

FIG. 14(a) shows a front view of the conventional objective lens driving apparatus described in the Official Gazette of Japanese Laid-open Public Patent Application Hei 5-342607.

FIG. 14(b) shows a bottom view of the conventional objective lens driving apparatus described in the Official Gazette of Japanese Laid-open Public Patent Application Hei 5-342607.

FIG. 14(c) shows a left side view of the conventional objective lens driving apparatus described in the Official Gazette of Japanese Laid-open Public Patent Application Hei 5-342607.

In FIG. 14, 1 is an objective lens and 2 is a lens holder to which the objective lens 1 are attached.

A focusing coil 3 for driving the objective lens 1 in the focusing direction (a direction of an arrow shown in FIG. 14, that is, the same direction as that of optical axis of the objective lens 1) and a tracking coil 4 for driving the objective lens 1 in the tracking direction (a direction of an arrow shown in FIG. 14) are wound around the lens holder 2.

Two support printed boards 5 are fixed at two positions indicated by a tip of arrow of the lens holder 2.

The starting ends and the terminating ends of windings of the focusing coil 3 and the tracking coil 4 are restrained by winding a few turns along coil restraining parts, which are located in the vicinity of the front end parts of the support printed boards 5 protruded from the top surface and the bottom surface of the lens holder 2.

6 is a fixed member which is comprised of a printed board and referred to as an act printed board. As shown in the left side view, the act printed board 6 has four patterns, each pattern having a land part and a through hole formed in the center or its periphery of the land part at one end.

7 is a support block which has a recessed part injected with damper material 8 therein and four through holes are formed in said recessed part. The act printed board 6 and the support block 7 are fixed so that four through holes of the act printed board 6 and four through holes of the support block 7, respectively, are placed coaxially.

Each end of four suspension wires 9 made of conductive metal wire is fixed to the act printed board 6 by soldering through the through hole of the act printed board 6 and the through hole of the support block 7 at one end, and is fixed to the coil restraining part of the support printed board 5 by soldering at the other end.

With the above-mentioned configuration, it is possible to obtain a conductive path which starts from one of the patterns of the act printed board 6, through 2 suspension wires 9 connected thereto, a land part of the support printed board 5 connected to the suspension wire 9, the focusing coil 3 connected to the land part of the support printed board 5, other land part of the support printed board 5 connected to other end of the focusing coil 3, other suspension wire 9 connected to the other land part of the support printed board 5, and returns to other one of the patterns of the act printed board 6 connected to the other suspension wire 9.

By feeding current of a focusing control signal to this path, focusing control of the objective lens 1 can be achieved.

Similarly as the focusing control signal, by feeding current of a tracking control signal to the conductive path containing the other two patterns of the act printed board 6, the other two suspension wires 9, the other two land parts of the support printed board 5, and the tracking coil 4, tracking control of the objective lens 1 can be achieved.

Furthermore, the support block 7 is fixed to a yoke 10 at the position as shown in the figure.

The lens holder 2 is supported by four suspension wires 9 so as to be located at the center between permanent magnets 11 and 12.

A magnetic circuit consisting of the permanent magnets 11 and 12, and the yoke 10 provided as an adjunct with the permanent magnets 11 and 12 generates a substantially uniform magnetic field in the vicinity of the focusing coil 3 and the tracking coil 4.

By feeding a focusing control signal to the focusing coil 3 within the uniform magnetic field, Lorentz force is generated, thereby producing a torque for driving the lens holder 2 in the focusing direction.

Likewise, by feeding a tracking control signal to the tracking coil 4 within the uniform magnetic field, Lorentz force is generated, thereby producing a torque for driving the lens holder 2 in the tracking direction.

As four suspension wires 9 are made of flexible metal wire, the lens holder 2 undergoes displacement due to the above-mentioned torque actuation.

Moreover, in the case that windings of the focusing coil 3 and the tracking coil 4 are wound by an automatic winder, parts of the support printed board 5 are configured to protrude from the lens holder 2 and the parts neighboring to the front ends of the protruded support printed board act as coil restraining parts, thereby facilitating restraint of the starting ends and the terminating ends of windings.

The objective lens driving apparatus is required to improve tracking sensitivity for corresponding to high-speed playback. As a solution, it is effective to reduce weight of the movable body.

Specific measures are thinning of the lens holder and weight reduction in the support printed board.

However, weight reduction causes rigidity degradation of the movable body, resulting in the deterioration of high-order resonance characteristic of the objective lens driving apparatus. Although thinning of the lens holder and weight reduction in the support printed board are effective in improving tracking sensitivity, these members become less integrated.

As a result, the coil restraining part of the support printed board which protrudes from the lens holder has a separate vibration mode at high frequencies.

For that reason, with respect to the vibration characteristic of the objective lens driving apparatus, undesired resonance and disturbance in phase occur and tracking performance of the objective lens driving apparatus for the optical data recording medium deteriorates. Further, there is the possibility of consuming electricity unnecessary for tracking.

On the other hand, in order to facilitate the arrangement of the starting ends and the terminating ends of the windings of the coils wound by an automatic winder, it is desirable to configure the coil restraining part of the support printed board to protrude from the lens holder as mentioned above.

An object of the present invention is to provide an inexpensive and easily manufacturable objective lens driving apparatus which is excellent in tracking sensitivity and free from the undesired resonance mode and so on.

Another object of the present invention is to provide an inexpensive manufacturing method for manufacturing an objective lens driving apparatus which is excellent in tracking sensitivity and free from the undesired resonance mode and so on without adding new process.

DISCLOSURE OF INVENTION

A first invention is an objective lens driving apparatus characterized by comprising an objective lens, a lens holder for holding said objective lens, a focusing coil with a central axis substantially parallel to the focusing direction of said objective lens, a tracking coil with a central axis substantially parallel to the tracking direction of said objective lens, a magnet for generating a magnetic field in the vicinity of said focusing coil and tracking coil, a support printed board having coil restraining parts which protrudes from side surfaces of said lens holder and restrain ends of winding of at least either said focusing coil or tracking coil, and a plurality of suspension wires made of conductive material, wherein said lens holder has a reinforcing rib which contacts with at least a part of the portion of said support printed board protruding from said lens holder.

The lens holder of the objective lens driving apparatus according to this invention has a reinforcing rib for supporting the coil restraining part of the support printed board.

This can prevent the coil restraining part of the support printed board from causing undesired resonance and unnecessary disturbance in phase.

This invention has the effect of realizing the inexpensive objective lens driving apparatus with high tracking sensitivity.

A second invention is the objective lens driving apparatus according to the first invention characterized by that the surface of said reinforcing rib that does not contact with the side surface of said lens holder forms an inclined plane with respect to the side surface of the lens holder, and winding of said coil restrained at said coil restraining part is located along said inclined plane.

In the case that the whole back surface of the support printed board is supported by the reinforcing rib, the winding of the coil around the coil restraining part can interfere physically with (contact with) the position of inserting the suspension wire.

In the objective lens driving apparatus according to this invention, the surface of said reinforcing rib that does not contact with the side surface of said lens holder forms an inclined plane with respect to the side surface of the lens holder (not parallel to the side surface of said lens holder).

Winding of coil is disposed along the inclined plane, thereby preventing the winding of coil from interfering with the insertion position of the suspension wire.

According to this invention, the coil restraining part of the support printed board does not cause undesired resonance and unnecessary disturbance in phase, and at the same time, it is possible to achieve stable winding work of coil and stable insertion of the suspension wire during assembly of the objective lens driving apparatus so that quality of product in a factory can be improved.

This invention has the effect of realizing the inexpensive and easily manufacturable objective lens driving apparatus with high tracking performance.

Further, this invention has the effect of realizing the objective lens driving apparatus in which the starting end and the terminating end of the coil wound by an automated winder are easily restrained.

A third invention is an objective lens driving apparatus of the first invention characterized by that winding of said coil is restrained at said restraining part by winding a turn or few turns around said support printed board and said reinforcing rib.

According to this invention, said support printed board and said reinforcing rib can become integrated without adhesive so that the coil restraining part of the support printed board does not cause undesired resonance and unnecessary disturbance in phase.

This invention has the effect of realizing the inexpensive objective lens driving apparatus with high tracking performance.

A fourth invention is an objective lens driving apparatus of the first invention or the third invention characterized by that said reinforcing rib part has a stepped portion or a grooved portion and winding of said coil which is restrained at said restraining part is located along said stepped portion or said grooved portion.

This invention can prevent winding of the coil from interfering with the insert position of the suspension wire.

Also, according to this invention, the coil restraining part of the support printed board does not cause undesired resonance and unnecessary disturbance in phase, and at the same time, it is possible to achieve stable winding work of coil and stable insertion of the suspension wire during assembly of the objective lens driving apparatus so that quality of product in a factory can be improved.

This invention has the effect of realizing the inexpensive and easily manufacturable objective lens driving apparatus with high tracking performance.

Further, this invention has the effect of realizing the objective lens driving apparatus in which the starting end and the terminating end of the coil wound by an automated winder are easily restrained.

A fifth invention is an objective lens driving apparatus of any of the first invention to the third invention characterized by that said support printed board has a plurality of notches and winding of said coil which is restrained at said restraining part is located along said notches.

This invention has the effect of realizing the objective lens driving apparatus in which the starting end and the terminating end of the coil wound by an automated winder are easily restrained.

A sixth invention is an objective lens driving apparatus comprising an objective lens, a lens holder for holding said objective lens, a focusing coil having a central axis substantially parallel to a focusing direction of said objective lens, a tracking coil having a central axis substantially parallel to a tracking direction of said objective lens, a magnet for generating a magnetic field in the vicinity of said focusing coil and said tracking coil, a support printed board which protrudes from side surfaces of said lens holder and has a restraining part for restraining end of winding of at least either said focusing coil or said tracking coil, a plurality of suspension wires made of conductive material, and an adhesive which is applied to a corner part defined by a protruded part of said support printed board from said lens holder and a side surface of said lens holder.

According to this invention, the coil restraining part of the support printed board does not cause undesired resonance and unnecessary disturbance in phase.

This invention has the effect of realizing the inexpensive and easily manufacturable objective lens driving apparatus with high tracking performance.

A seventh invention is an objective lens driving apparatus of the sixth invention characterized by that said lens holder has a bonded part with said support printed board, said bonded part comprising a first depression as an adhesive reservoir and a groove which extends from said first depression to a base of said support printed board.

According to this invention, the coil restraining part of the support printed board does not cause undesired resonance and unnecessary disturbance in phase.

Further, fixing firmly said support printed board by disposing so as to push said support printed board against said first depression, as well as overflowing said adhesive to said corner part by extending said adhesive along said groove of said lens holder which extends from said first depression to said corner part can be achieved during a single process. Therefore, the adhesive can be applied to said corner part without adding any new process. This invention has the effect of realizing the inexpensive and easily manufacturable objective lens driving apparatus with high tracking performance.

A eighth invention is an objective lens driving apparatus of the sixth invention characterized by that said lens holder comprises a second depression as an adhesive reservoir for bonding said objective lens, and a groove which extends from said second depression to a base of said support printed board.

According to this invention, the coil restraining part of the support printed board does not cause undesired resonance and unnecessary disturbance in phase.

Further, by disposing a member so as to push a member against said second depression, said member and said objective lens are fixed firmly, and by extending said adhesive along said groove of said lens holder which extends from said first depression to said corner, said adhesive can be overflowed to said corner part. Therefore, the adhesive can be applied to said corner part without adding any new process.

This invention has the effect of realizing the inexpensive and easily manufacturable objective lens driving apparatus with high tracking performance.

A ninth invention is a manufacturing method of the objective lens driving apparatus of the sixth invention comprising steps of dropping an adhesive into said first depression formed on said lens holder, and fixing firmly said support printed board by pushing said support printed board against said first depression, as well as overflowing said adhesive to said corner part by extending said adhesive along said groove of said lens holder which extends from said first depression to said corner part.

According to this invention, the adhesive can be applied to said corner part without adding any new process. As a result, the coil restraining part of the support printed board does not cause undesired resonance and unnecessary disturbance in phase.

This invention has the effect of realizing the inexpensive manufacturing method for manufacturing the objective lens driving apparatus with high tracking performance.

A tenth invention is a manufacturing method of the objective lens driving apparatus of the sixth invention comprising steps of dropping an adhesive into said second depression formed on said lens holder, and fixing firmly said objective lens by pushing a member against said second depression, as well as overflowing said adhesive to said corner part by extending said adhesive along said groove of said lens holder which extends from said second depression to said corner part.

According to this invention, the adhesive can be applied to said corner part without adding any new process. As a result, the coil restraining part of the support printed board does not cause undesired resonance and unnecessary disturbance in phase.

This invention has the effect of realizing the inexpensive manufacturing method for manufacturing the objective lens driving apparatus with high tracking performance.

"Member" means an optional member. Typically, it is a lens protector (FIG. 13 (b) and FIG. 13(c).

The novel features of the invention will be hereinafter fully described and particularly pointed out in the appended claims, and the configuration and details of the invention, together with other objects and features thereof, will become better understood and appreciated by reference to the following detailed description when considered in conjunction with the accompanying drawings.

BRIEF DESCRIPTION OF THE DRAWINGS

FIG. 4(a) is a front view of a movable section of the objective lens driving apparatus of embodiment 2. FIG. 4(b) is a sectional view taken along the A—A line of FIG. 4(a).

FIG. 7 is a perspective view in schematic form depicting the configuration of the reinforcing rib of the objective lens driving apparatus of embodiment 3.

FIG. 10(b) is a bottom view of FIG. 10(a). FIG. 10(c) is a sectional view taken along the B—B line of FIG. 10(a).

FIG. 11(a) is a perspective view in schematic form depicting the configuration of the reinforcing rib of the objective lens driving apparatus of embodiment 5. FIG. 11(b) and FIG. 11(c) depict a manufacturing method for manufacturing the objective lens driving apparatus of embodiment 5.

It is noted that a part or whole of the figures are schematically depicted for diagrammatic representation and they do not necessarily reflect actual relative size and position of components shown therein.

BEST MODE FOR EMBODYING THE INVENTION

Embodiments which makes a concrete explanation of best mode for embodying the present invention will be described herein after with the appended figures. However, the present invention is not limited to the following embodiments unless it exceeds the extent of the spirit.

<<Embodiment 1>>

Figure 1:
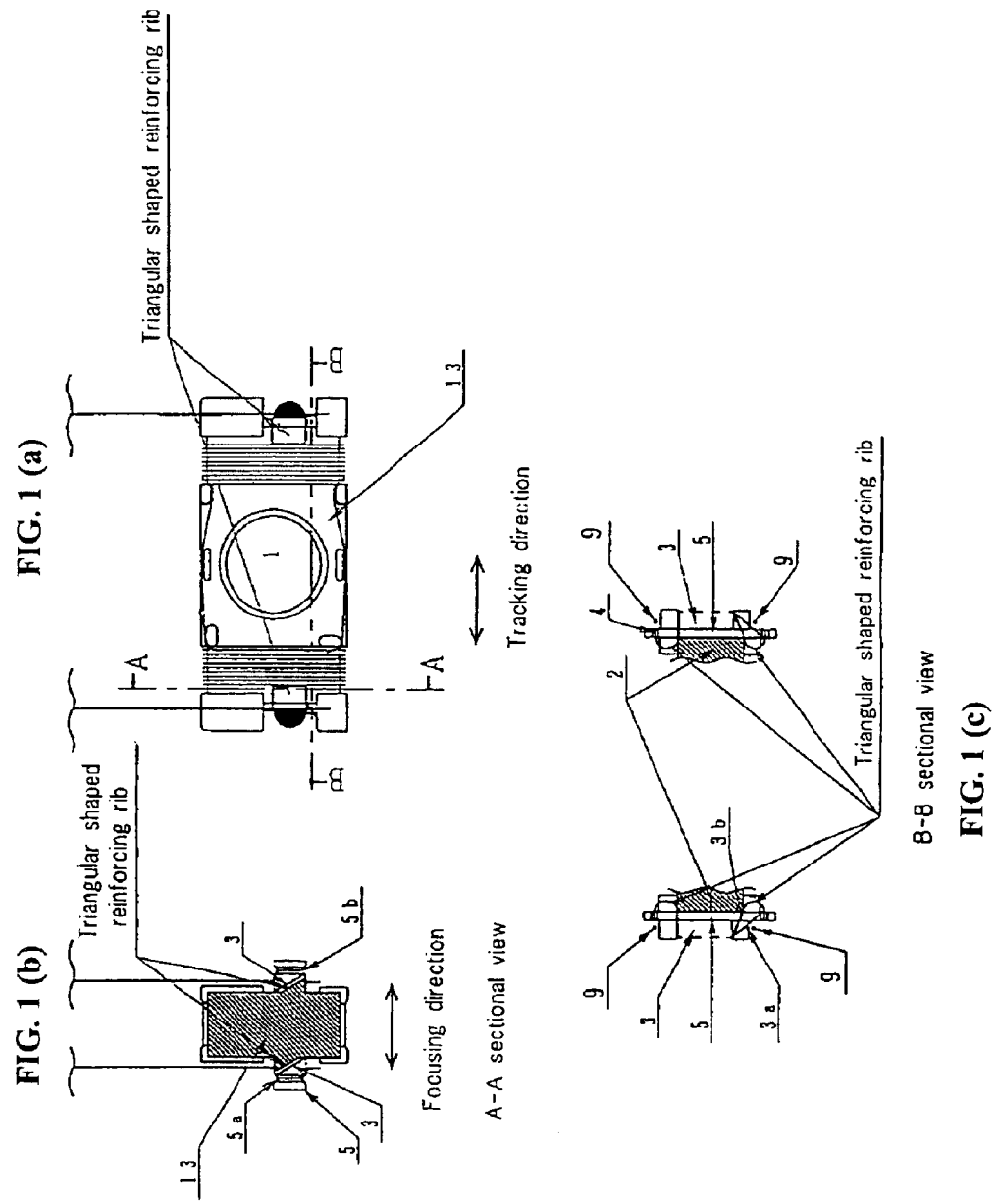
FIG. 1(a) is a front view of the objective lens driving apparatus of embodiment 1.
FIG. 1(b) is a sectional view taken along the A—A line of FIG. 1(a).
FIG. 1(c) is a sectional view taken along the B—B line of a FIG 1(a).
Figure 2:
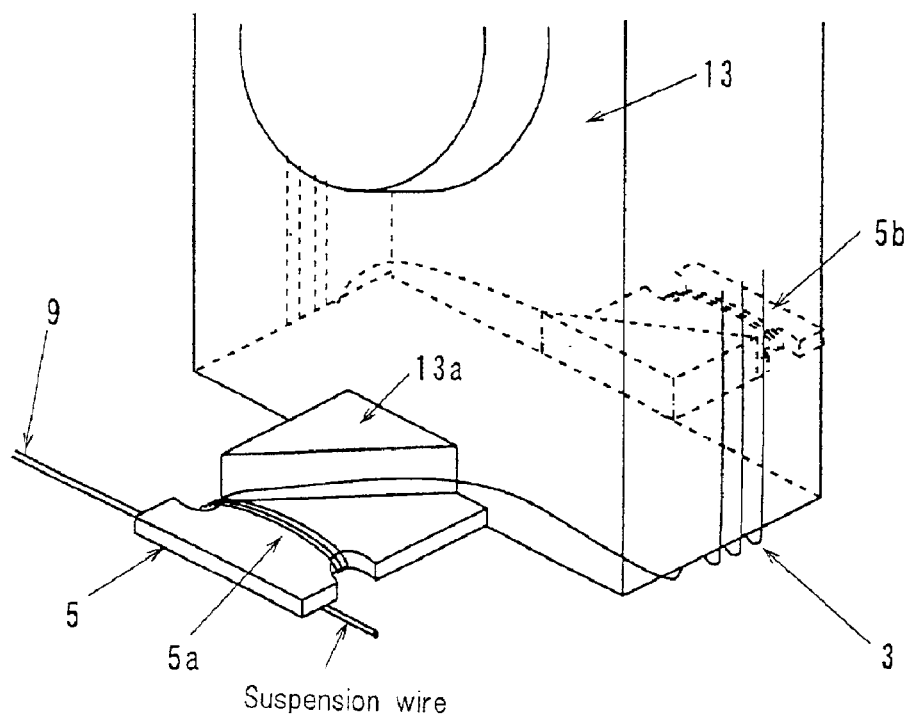
FIG. 2 is a perspective view in schematic form depicting the configuration of the reinforcing rib of the objective lens driving apparatus of embodiment 1.
Figure 3:
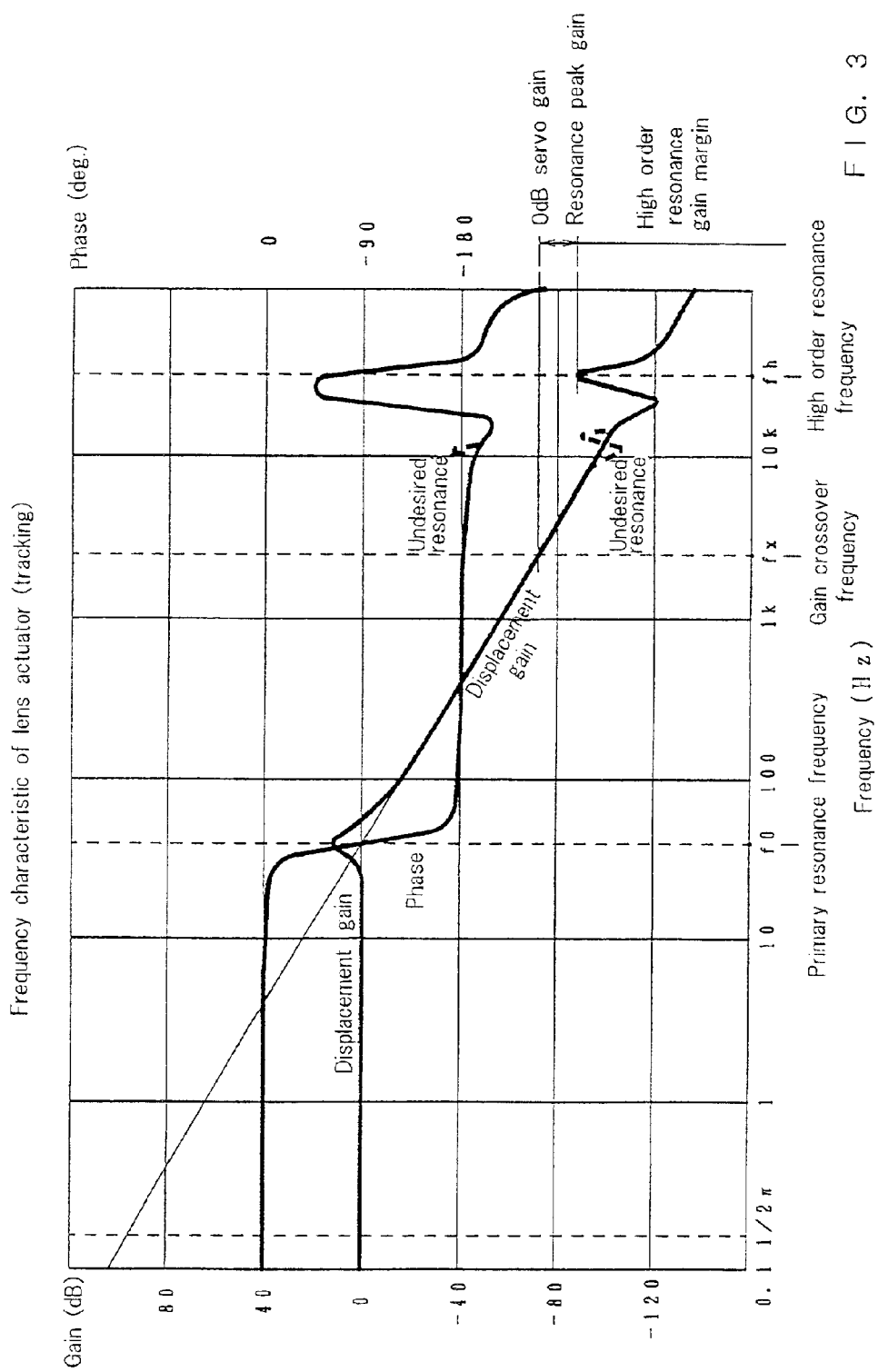
FIG. 3 is a graph showing frequency characteristic of the objective lens driving apparatus of embodiment 1.

Referring to FIG. 1 to FIG. 3, an objective lens driving apparatus of embodiment 1 according to the present invention will be explained.

First, the vibration characteristic of the objective lens driving apparatus will be explained.

FIG. 3 shows the frequency characteristic of displacement gain in the tracking direction with respect to the objective lens driving apparatus. The peak frequency having the highest displacement gain in the whole frequency range is referred to as primary resonance and the peak frequency in higher frequency range is referred to as high order resonance.

And, undesired resonance appearing in proximity to 10 kHz in the drawing is caused by self-resonance of a support printed board.

On the basis of gain crossover frequency fx shown in the drawing, low-frequency side indicates servo frequency range of the objective lens driving apparatus (i.e. the frequency range in which vibration, error and so on can be suppressed by controlling the objective lens driving apparatus), and high-frequency side indicates non-servo frequency range (i.e. high-frequency range in which the objective lens driving apparatus gives no response).

In the presence of undesired resonance in the non-servo frequency range, when coil current exceeding minimum track displacement is applied, tracking cannot be carried out with tracking accuracy in the objective lens driving apparatus, potentially resulting in an off-track state.

However, as servo operation is not performed in this frequency range, the displacement is kept uncontrolled and off-track state cannot be resolved.

In equipment using objective lens driving apparatus (e.g., DVD device), a phase compensating filter ensures phase margin of 35° to 60° known as stable for servo control in gain crossover frequency range. At that time, the presence of phase disturbance due to undesired resonance can interfere with the provision of the phase margin. Therefore, undesired resonance in non-servo frequency range deteriorates tracking performance of tracking control in the optical disk apparatus. Further, it causes unnecessary electricity consumption.

As described above, in order to achieve an optical disk apparatus with high tracking performance, it is highly important to suppress self-resonance of a support printed board.

For this purpose, in the objective lens driving apparatus of embodiment 1, a lens holder 13 has four reinforcing ribs 13a so as to suppress self-resonance of the support printed board.

The remaining structure of the apparatus is the same as the corresponding structure of the above-mentioned conventional objective lens driving apparatus.

FIG. 1(a) shows a front view, FIG. 1(b) shows a sectional view taken along the A—A line and FIG. 1(c) shows a sectional view taken along the B—B line of a movable section of the objective lens driving apparatus of embodiment 1 according to the present invention. FIG. 2 shows a perspective view in schematic form depicting the configuration of the reinforcing rib 13a of the objective lens driving apparatus of embodiment 1 (The reinforcing rib 13a is represented larger than life.)

The movable section means movable parts held by a suspension wires 9 in the objective lens driving apparatus, including an objective lens 1, the lens holder 13, a focusing coil 3, a tracking coil 4, support printed boards 5, and the suspension wires 9.

As parts other than the movable parts are the same as the corresponding parts of the above-mentioned conventional objective lens driving apparatus, description is omitted.

In the objective lens driving apparatus of embodiment 1, parts except for the four reinforcing ribs 13a of the lens holder and placement of windings of coils (the focusing coil 3 and the tracking coil 4) are the same as the corresponding parts of the conventional objective lens driving apparatus, these parts are identified by the same reference numbers. Description thereof is omitted.

As shown in FIG. 1 (b) and FIG. 2, the reinforcing rib 13a of the lens holder 13 closely contacts with the support printed board 5 protruding from the side surfaces of the lens holder (front surface and back surface) (both ends of each of two support printed boards protrude from the side surfaces of the lens holder, respectively (at four locations in total)), thereby reinforcing the base of the support printed board 5. Preferably, the contact surfaces of the support printed board 5 and the reinforcing rib 13a are fixed to each other by adhesive.

A surface of the reinforcing rib that does not contact with the side surface of the lens holder forms an inclined plane with respect to the side surface of the lens holder. The reinforcing rib 13a of embodiment 1 is shaped like a triangle pole with a right triangular cross section, and the contact surface with the printed board is shaped like said right triangle.

Regarding a base side (the same plane surface as the side surface of the lens holder) as a bottom line of said triangle (one of the lines making a right angle), an apex of the triangle (the furthermost position from the side surface of the lens holder) is located in the vicinity of a coil restraining part of the support printed board (located near the front end of the support printed board).

Cross section of the reinforcing rib may be shaped like a trapezoid in place of a triangle. A trapezoidal surface of the reinforcing rib that does not contact with the side surface of the lens holder forms an inclined plane with respect to the side surface of the lens holder.

Referring to FIG. 1(b) (a sectional view viewed from right side along the A—A line of the front view of FIG. 1(a)) and FIG. 2, arrangement method of windings of coils will be explained hereinafter.

Winding of the focusing coil 3 is wound a few turns along the coil restraining part 5a located in the vicinity of the front end of the support printed board for restraining (the starting end part of the focusing coil 3 is formed), and after that, the winding drawn from said staring end part is located along the inclined plane of the reinforcing rib 13a in the shape of a right triangle as a guideline.

The winding located along the inclined plane is led to a focusing coil winding part of the lens holder 13 having reinforcing ribs. After that, the winding is wound on it to form the focusing coil 3.

On the completion of winding up, the winding is located along the inclined plane of the reinforcing rib 13a at the side of a coil restraining part 5b as a guideline.

The winding located along the inclined plane is led to the coil restraining part 5b located in the vicinity of the front end of the support printed board and is wound a few turns along the coil restraining part 5b for restraining (the terminating end part of the focusing coil 3 is formed).

Similarly, the tracking coil 4 is also located along the inclined planes of other two reinforcing ribs as guidelines and wound on a tracking coil winding part of the lens holder 13 having the reinforcing ribs.

Referring to FIG. 1(c), a cross sectional view taken along the B—B line of FIG. 1(a), wiring paths 3a and 3b of the focusing coil 3 between the coil restraining part 5a of the support printed board 5 and the focusing coil winding part of the lens holder 13 having the reinforcing ribs will be described.

In the conventional objective lens driving apparatus, owing to the absence of reinforcing rib (as there is no guideline for coil), when the winding is wound by an automated winder, the shortest path 3a of wiring is likely to be selected.

However, this raises a possibility that the shortest path 3a contacts with the suspension wire 9 (the shortest path 3a interferes with the suspension wire 9) Assembly process of the objective lens driving apparatus includes the inserting process of the suspension wire 9 following the above-mentioned winding process. Therefore, when the suspension wire contacts with the focusing coil, there is possibility of a failure to insert the wire.

On the contrary, in the objective lens driving apparatus of embodiment 1, the wiring path of the focusing coil 3 is guided by the reinforcing ribs so as to be fixed at the path 3b.

On the wiring path 3b, the winding does not contact with the suspension wire 9. Accordingly, the above-mentioned problem does not occur during assembly process, thereby facilitating assembly of the objective lens driving apparatus and improving quality of product in a factory.

Next, the results of the present embodiment will be described. By using the lens holder with reinforcing ribs in the shape of right triangle, undesired resonance of 6 dB (12 kHz) disappears and high order resonance margin (difference between displacement gain of 1 kHz and peak of high order resonance) is improved from 40 dB to 45 dB.

This promotes the tracking performance of the objective lens driving apparatus for the optical data recording medium.

Further, it enables a stable arrangement of the starting ends and the terminating ends of coils by automated winder (arrangement for restraining the starting end and the terminating end of winding of the coil at the support printed board), as well as insertion of the suspension wire.

<<Embodiment 2>>

Figure 5:
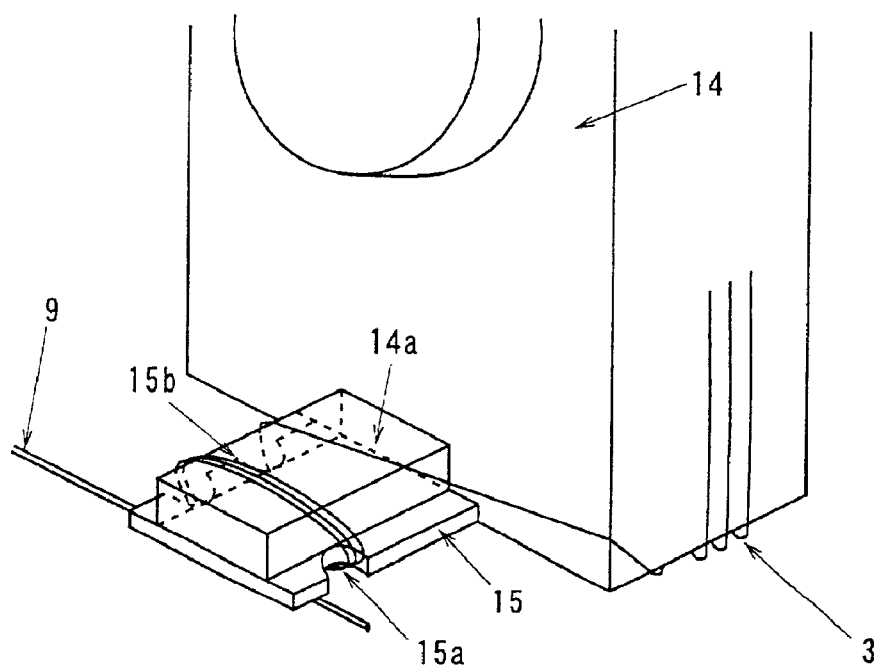
FIG. 5 is a perspective view in schematic form depicting the configuration of the reinforcing rib of the objective lens driving apparatus of embodiment 2.

Referring to FIG. 4 and FIG. 5, an objective lens driving apparatus of embodiment 2 according to the present invention will be explained.

In order to suppress self-resonance of a support printed board, the objective lens driving apparatus of embodiment 2 comprises a lens holder 14 having four reinforcing ribs and a support printed board 15 with a plurality of notches. The reinforcing rib 14a is different from that of embodiment 1 in shape.

The remaining structure of the apparatus is the same as the corresponding structure of the above-mentioned conventional objective lens driving apparatus.

FIG. 4(a) shows a front view, and FIG. 4(b) shows a sectional view taken along the A—A line of a movable section of the objective lens driving apparatus of embodiment 2. FIG. 5 shows a perspective view in schematic form depicting the configuration of the reinforcing rib 14a of the objective lens driving apparatus of embodiment 2. (The reinforcing rib is presented larger than life.)

The movable section means movable parts held by suspension wires 9 in the objective lens driving apparatus, including the objective lens 1, the lens holder 14, the focusing coil 3, the tracking coil 4, the support printed boards 15, and the suspension wires 9.

As parts other than the movable parts are the same as the corresponding parts of the above-mentioned conventional objective lens driving apparatus, description is omitted.

In the objective lens driving apparatus of embodiment 2, parts except for four reinforcing ribs 14a of the lens holder, plural notches of the support printed board 15 and placement of windings of coils (the focusing coil 3 and the tracking coil 4) are the same as the corresponding parts of the conventional objective lens driving apparatus, these parts are identified by the same reference numbers. Description thereof is omitted.

As shown in FIG. 5, the reinforcing rib 14a of the lens holder 14 with reinforcing ribs closely contacts with the support printed board 15 protruding from the side surfaces of the lens holder (front surface and back surface) (both ends of each of two support printed boards protrude from the side surfaces of the lens holder, respectively (at four locations in total)), thereby reinforcing the base of the support printed board 15.

At four coil restraining parts, the starting ends and the terminating ends of windings of the focusing coil 3 and the tracking coil 4 are fixed.

In embodiment 2, the contact surfaces of the support printed board 15 and the reinforcing rib 14a may be fixed to each other by adhesive or may not be fixed.

At the coil restraining part, winding of a coil is wound a few turns around the reinforcing rib 14a and the support printed board 15 with notches so as to tie the reinforcing rib 14a and the support printed board 15 with notches in bundle. In this way, the reinforcing rib 14a and the support printed board 15 with notches are firmly fixed to each other by winding of the coil.

With this configuration, resonance of the support printed board with notches 15 can be suppressed by the reinforcing rib 14a.

The reinforcing rib 14a is formed so as to have the same height as the support printed board 15 and the same width as or narrower width than the notched portion of the support printed board 15. The support printed board 15 with notches comprises a plurality of notches 15b and 15c (the notch may be single) in addition to the coil restraining parts 15a and 15d.

Referring to FIG. 4(b) (a sectional view viewed from right side along the A—A line of the front view of FIG. 4(a)) and FIG. 5 arrangement method of winding of coils will be explained hereinafter.

At the coil restraining part 15a in the vicinity of the front end of the support printed board, winding of the focusing coil 3 is wound a few turns around the reinforcing rib 14a and the support printed board 15 with notches so as to tie the reinforcing rib 14a and the support printed board 15 with notches in bundle for restraining (the starting end part of the focusing coil 3 is formed), and after that, the winding drawn from said staring end part is led to the focusing coil winding part of the lens holder 14 having reinforcing ribs through the notch 15b of the support printed board with notches (being guided by the notch 15b). After that, the winding is wound on it to form the focusing coil 3. On the completion of winding work, the winding is led to the coil restraining part 15d through the notch 15c of the support printed board with notches (being guided by the notch 15c).

At the coil restraining part 15d, winding of the focusing coil 3 is wound a few turns around the reinforcing rib and the support printed board 15 with notches so as to tie the reinforcing rib and the support printed board 15 with notches in bundle for restraining (the terminating end part of the focusing coil 3 is formed).

Similarly, winding of the tracking coil 4 is also wound a few turns around the reinforcing rib and the support printed board 15 with notches for restraining, and after that, the restrained winding is led to the tracking coil winding part of the lens holder 14 with reinforcing ribs using the notches 15b and 15c of the support printed board with notches as guides. The winding is wound on said tracking coil winding part.

In the objective lens driving apparatus of embodiment 2, a wiring path of the focusing coil 3 is guided by the notches 15b and 15c of the support printed board with notches so as to be fixed at the path 3b (a sectional view taken along the B—B line of FIG. 1(a) depicted in FIG. 1(c).

On the wiring path 3b, the winding does not contact with the suspension wire 9. Accordingly, no problem occurs during assembly process, thereby facilitating assembly of the objective lens driving apparatus and improving quality of product in a factory.

According to this embodiment, undesired resonance of 6 dB (12 kHz) disappears and high order resonance margin (difference between displacement gain of 1 kHz and peak of high order resonance) is improved from 40 dB to 45 dB.

This promotes tracking performance of the objective lens driving apparatus for the optical data recording medium.

Further, it enables a stable arrangement of the starting ends and the terminating ends of windings of the coils by automated winder (arrangement for restraining the starting ends and the terminating ends of windings of the coils at the support printed board), as well as insertion of the suspension wire.

<<Embodiment 3>>

Figure 6:
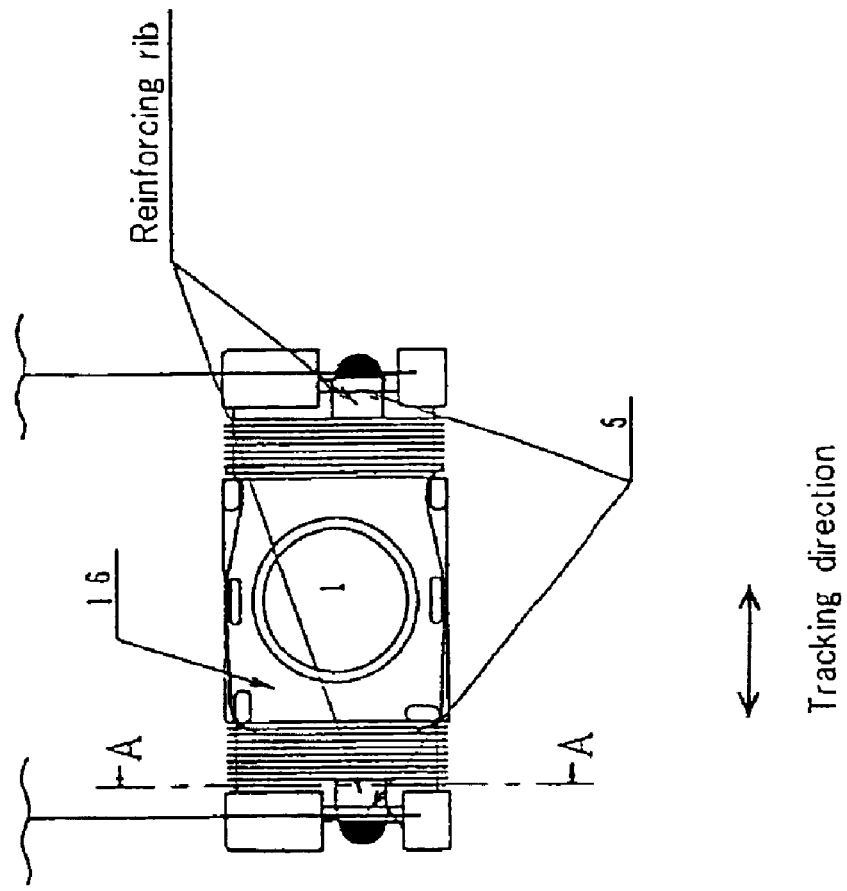
FIG. 6(a) is a front view of a movable section of the objective lens driving apparatus of embodiment 3.
FIG. 6(b) is a sectional view taken alone the A—A line of FIG. 6(b).
Figure 6:
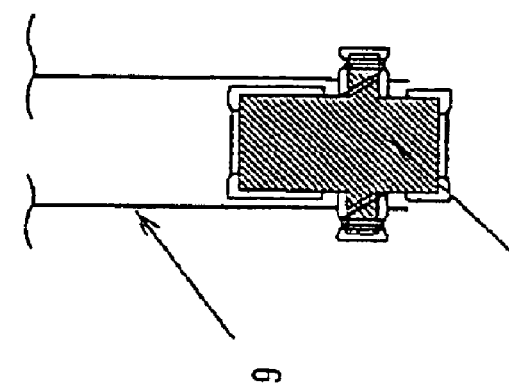

Referring to FIG. 6 and FIG. 7, an objective lens driving apparatus of embodiment 3 according to the present invention will be explained.

In order to suppress self-resonance of a support printed board, the objective lens driving apparatus of embodiment 3 comprises a lens holder 16 having four reinforcing ribs. The reinforcing rib 16a is different from that of embodiment 1 or embodiment 2 in shape.

The remaining structure of the apparatus is the same as the corresponding structure of the above-mentioned conventional objective lens driving apparatus.

FIG. 6(a) shows a front view, and FIG. 6(b) shows a sectional view taken along the A—A line of FIG. 6(a) of a movable section of the objective lens driving apparatus of embodiment 3. FIG. 7 shows a perspective view in schematic form depicting the configuration of the reinforcing rib 16a of the objective lens driving apparatus of embodiment 3. (The reinforcing rib is represented larger than life.)

The movable section means movable parts held by the suspension wires 9 in the objective lens driving apparatus, including the objective lens 1, the lens holder 16, the focusing coil 3, the tracking coil 4, the support printed boards 5, and the suspension wires 9.

As parts other than the movable parts are the same as the corresponding parts of the above-mentioned conventional objective lens driving apparatus, description is omitted.

In the objective lens driving apparatus of embodiment 3, parts except for the four reinforcing ribs 16a of the lens holder and placement of windings of coils (the focusing coil 3 and the tracking coil 4) are the same as the corresponding parts of the conventional objective lens driving apparatus, these parts are identified by the same reference numbers. Description thereof is omitted.

As shown in FIG. 7, the reinforcing rib 16a of the lens holder 16 closely contacts with the support printed board 5 protruding from the side surfaces of the lens holder (front surface and back surface) (both ends of each of two support printed boards protrude from the side surfaces of the lens holder, respectively (at four locations in total)), thereby reinforcing the base of the support printed board.

At four coil restraining parts, each of the starting ends and the terminating ends of windings of the focusing coil 3 and the tracking coil 4 are fixed, respectively.

In embodiment 3, the contact surfaces of the support printed board and the reinforcing rib may be fixed to each other by adhesive or may not be fixed.

At the coil restraining part, winding of a coil is wound a few turns around the reinforcing rib 16a and the support printed board 5 so as to tie the reinforcing rib 16a and the support printed board 5 in bundle. In this way, the reinforcing rib 16a and the support printed board 5 are firmly fixed to each other by winding of the coil.

With this configuration, resonance of the support printed board can be suppressed by the reinforcing rib.

The reinforcing rib 16a is formed so as to have the same height as the support printed board 5 and the same width as or narrower width than the notched portion of the support printed board.

Referring to FIG. 6(b) (a sectional view viewed from right side along the A—A line of the front view of FIG. 6(a) and FIG. 7, arrangement method of windings of coils will be explained hereinafter.

At the coil restraining part 5a in the vicinity of the front end of the support printed board, winding of the focusing coil 3 is wound a few turns around the reinforcing rib 16a and the support printed board 5 so as to tie the reinforcing rib 16a and the support printed board 5 in bundle for restraining (the starting end part of the focusing coil 3 is formed), and after that, the winding drawn from said staring end part is located along an inclined plane (a plane which is not parallel to a side surface of the lens holder) of upper part of a stepped portion formed on the reinforcing rib 16a (being guided by the inclined plane) and then is led to the focusing coil winding part of the lens holder 16. After that, the winding is wound on it to form the focusing coil 3.

On the completion of the winding work, the winding is located along an inclined plane of upper part of a stepped portion formed on the reinforcing rib 16a (being guided by the inclined plane) and then is led to the coil restraining part 15b in the vicinity of the front end of the support printed board.

At the coil restraining part 5b, winding of the focusing coil 3 is wound a few turns around the reinforcing rib 16a and the support printed board 5 so as to tie the reinforcing rib 16a and the support printed board 5 in bundle for restraining (the terminating end part of the focusing coil 3 is formed).

Similarly, winding of the tracking coil 4 is also wound a few turns around the reinforcing rib 16a and the support printed board 5 for restraining by using a grooved portion of the reinforcing rib 16a as a guide, and then is led to the tracking coil winding part of the lens holder for winding.

In the objective lens driving apparatus of embodiment 3, a wiring path of the focusing coil 3 is guided by the inclined plane of the upper part of the stepped portion formed on the reinforcing rib so as to be fixed at the path 3b (a sectional view taken along the B—B line of FIG. 1).

On the wiring path 3b, the winding does not contact with the suspension wire 9. Accordingly, no problem occurs during assembly process, thereby facilitating assembly of the objective lens driving apparatus and improving quality of product in a factory.

According to this embodiment, undesired resonance of 6 dB (12 kHz) disappears and high order resonance margin (difference between displacement gain of 1 kHz and peak of high order resonance) is improved from 40 dB to 45 dB.

This promotes tracking performance of the objective lens driving apparatus for the optical data recording medium.

Further, it enables a stable arrangement of the starting ends and the terminating ends of windings of the coils by automated winder (arrangement for restraining the starting ends and the terminating ends of windings of the coils at the support printed board), as well as insertion of the suspension wire.

<<Embodiment 4>>

Figure 8:
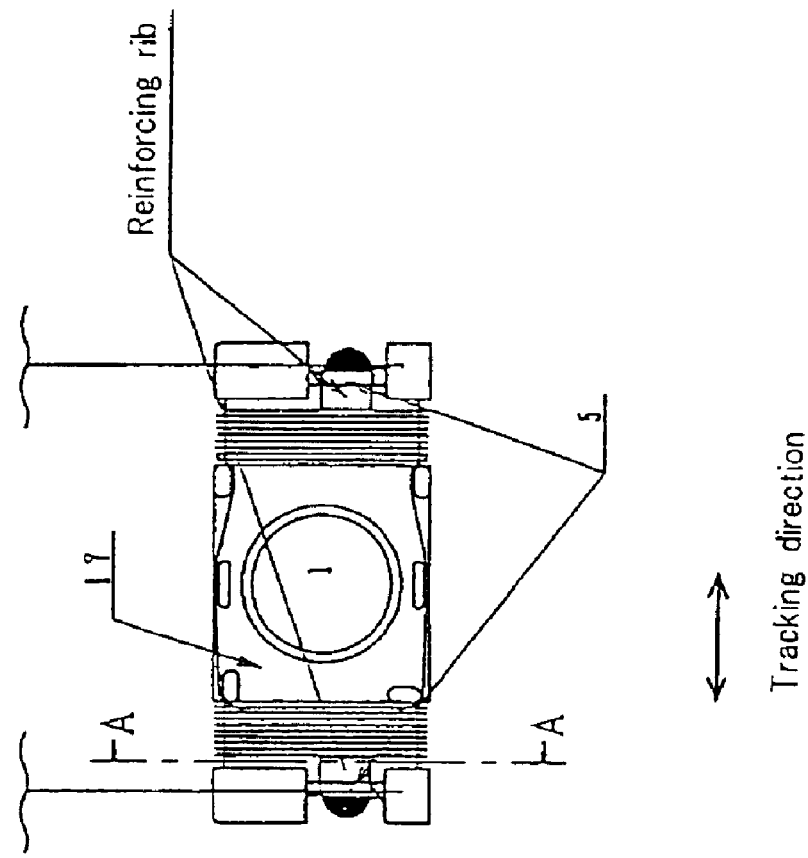
FIG. 8(a) is a front view of a movable section of the objective lens driving apparatus of embodiment 4.
FIG. 8(b) is a front view and a sectional view taken alone the A—A line of FIG. 8(a).
Figure 8:
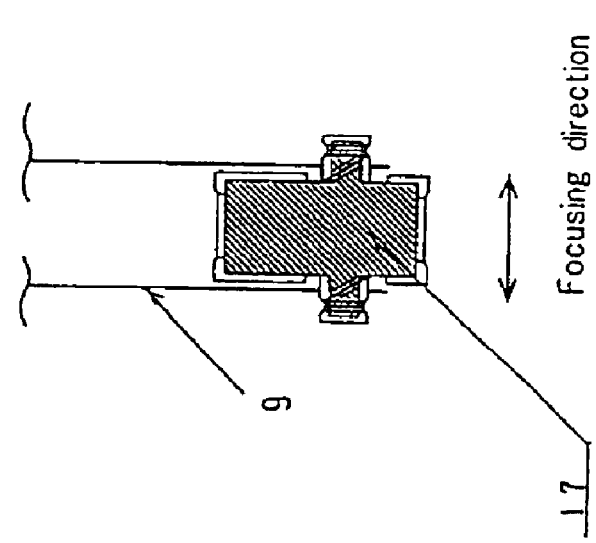
Figure 9:
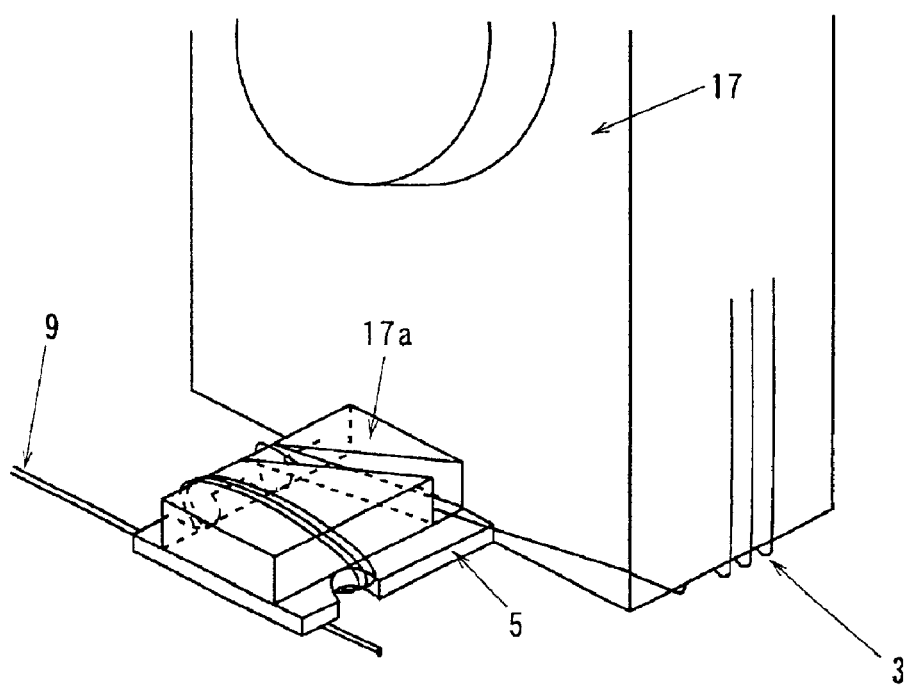
FIG. 9 is a perspective view in schematic form depicting the configuration of the reinforcing rib of the objective lens driving apparatus of embodiment 4.

Referring to FIG. 8 and FIG. 9, an objective lens driving apparatus of embodiment 4 according to the present invention will be explained.

In order to suppress self-resonance of a support printed board, the objective lens driving apparatus of embodiment 4 comprises a lens holder 17 having four reinforcing ribs. The reinforcing rib 17a is different from that of embodiment 1, embodiment 2 or embodiment 3 in shape.

The remaining structure of the apparatus is the same as the corresponding structure of the above-mentioned conventional objective lens driving apparatus.

FIG. 6(a) shows a front view (a), and FIG. 6(b) shows a sectional view taken along the A—A line of a movable section of the objective lens driving apparatus of embodiment 4. FIG. 9 shows a perspective view in schematic form depicting the configuration of the reinforcing rib 17a of the objective lens driving apparatus of embodiment 4. (The reinforcing rib is represented larger than life.)

The movable section means movable parts held by the suspension wires 9 in the objective lens driving apparatus, including the objective lens 1, the lens holder 17, the focusing coil 3, the tracking coil 4, the support printed boards 5, and the suspension wires 9.

As parts other than the movable parts are the same as the corresponding parts of the above-mentioned conventional objective lens driving apparatus, description is omitted.

In the objective lens driving apparatus of embodiment 4, parts except for the four reinforcing ribs 17a of the lens holder and placement of windings of coils (the focusing coil 3 and the tracking coil 4) are the same as the corresponding parts of the conventional objective lens driving apparatus, these parts are identified by the same reference numbers. Description thereof is omitted.

As shown in FIG. 9, the reinforcing rib 17a of the lens holder 17 closely contacts with the support printed board 5 protruding from the side surfaces of the lens holder (front surface and back surface) (both ends of each of two support printed boards protrude from the side surfaces of the lens holder, respectively (at four locations in total)), thereby reinforcing the base of the support printed board.

At four coil restraining parts, the starting ends and the terminating ends of windings of the focusing coil 3 and the tracking coil 4 are fixed.

In embodiment 4, the contact surfaces of the support printed board and the reinforcing rib may be fixed to each other by adhesive or may not be fixed.

At the coil restraining part, winding of a coil is wound a few turns around the reinforcing rib 17a and the support printed board 5 so as to tie the reinforcing rib and the support printed board 5 in bundle. In this way, the reinforcing rib 17a and the support printed board 5 are firmly fixed to each other by the winding of the coil.

With this configuration, resonance of the support printed board 5 can be suppressed by the reinforcing rib.

The reinforcing rib 17a is formed so as to have the same height as the support printed board 5 and the same width as or narrower width than the notched portion of the support printed board.

Referring to FIG. 8(b) (a sectional view viewed from right side along the A—A line of the front view of FIG. 8(a)) and FIG. 9, arrangement method of windings of coils will be explained hereinafter.

At the coil restraining part 5a in the vicinity of the front end of the support printed board, winding of the focusing coil 3 is wound a few turns around the reinforcing rib 17a and the support printed board 5 so as to tie the reinforcing rib 17a and the support printed board 5 in bundle for restraining (the starting end part of the focusing coil 3 is formed), and then, the winding drawn from said staring end part is led to the focusing coil winding part of the lens holder 17 through a grooved portion formed on the reinforcing rib 17a. After that, the winding is wound on it to form the focusing coil 3.

On the completion of the winding work, the winding is led to the coil restraining part 5b in the vicinity of the front end of the support printed board through the grooved portion formed on the reinforcing rib 17a (being guided by the grooved portion).

At the coil restraining part 5b, winding of the focusing coil 3 is wound a few turns around the reinforcing rib 17a and the support printed board 5 so as to tie the reinforcing rib 17a and the support printed board 5 in bundle for restraining (the terminating end part of the focusing coil 3 is formed).

Similarly, winding of the tracking coil 4 is also wound a few turns around the reinforcing rib 17a and the support printed board 5 for restraining, being guided by the grooved portion of the reinforcing rib 17a as a guide, and then is wound on the tracking coil winding part of the lens holder 17 with reinforcing ribs.

In the objective lens driving apparatus of embodiment 4, a wiring path of the focusing coil 3 is guided by the groove of the reinforcing rib so as to be fixed at the path 3b (as shown in FIG. 1(c) which is a sectional view taken along the B—B line of FIG. 1(a)).

On the wiring path 3b, the winding does not contact with the suspension wire 9. Accordingly, no problem occurs during assembly process, thereby facilitating assembly of the objective lens driving apparatus and improving quality of product in a factory.

According to this embodiment, undesired resonance of 6 dB (12 kHz) disappears and high order resonance margin (difference between displacement gain of 1 kHz and peak of high order resonance) is improved from 40 dB to 45 dB.

This promotes tracking performance of the objective lens driving apparatus for the optical data recording medium.

Further, it enables a stable arrangement of the starting ends and the terminating ends of windings of the coils by automated winder (arrangement for restraining the starting ends and the terminating ends of windings of the coils at the support printed board), as well as insertion of the suspension wire.

<<Embodiment 5>>

Figure 10:
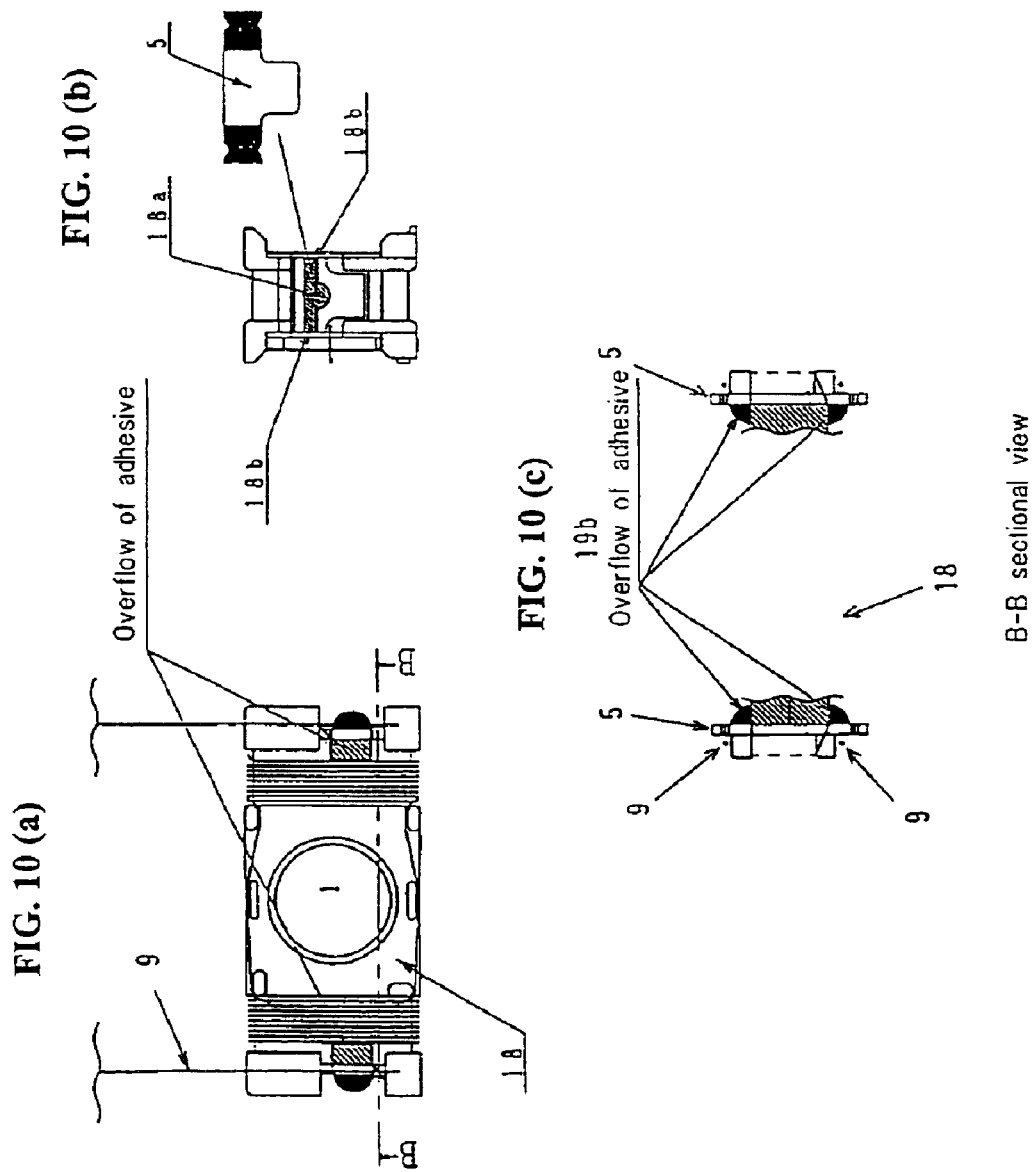
FIG. 10 is a front view of a movable section of the objective lens driving apparatus of embodiment 5.

Referring to FIG. 10 and FIG. 11, an objective lens driving apparatus of embodiment 5 according to the present invention will be explained.

In the objective lens driving apparatus of embodiment 5, an adhesive is applied to the corner part formed by the part of the support printed board 5 which protrudes from said lens holder and the side surface of the lens holder 18 in order to suppress self-resonance of the support printed board. Further, the lens holder 18 has a pasted part with said support printed board 5.

The above-mentioned pasted part has a first depression as an adhesive reservoir and a groove which extends from the above-mentioned first depression to a base of the above-mentioned support printed board.

The remaining structure of the apparatus is the same as the corresponding structure of the above-mentioned conventional objective lens driving apparatus.

FIG. 10(a) shows a front view, and FIG. 10(b) shows a right side view (showing the appearance of the apparatus from which the support printed board 5 is removed), and FIG. 10 (c) shows a sectional view taken along the B—B line of a movable section of the objective lens driving apparatus of embodiment 5. FIG. 11(a) shows a perspective view in schematic form depicting the configuration of the reinforcing rib of the objective lens driving apparatus of embodiment 5. (The reinforcing rib is represented larger than life.), and FIG. 11(b) and FIG. 11(c) show the manufacturing method of the objective lens driving apparatus according to this invention.

The movable section means movable parts held by the suspension wires 9 in the objective lens driving apparatus, including the objective lens 1, the lens holder 18, the focusing coil 3, the tracking coil 4, the support printed boards 5, and the suspension wires 9.

As parts other than the movable parts are the same as the corresponding parts of the above-mentioned conventional objective lens driving apparatus, description is omitted.

As shown in the right side view of FIG. 10 and FIG. 11, the lens holder 18 comprises a first depression 18a and a groove 18b on the bottom (an applied area of adhesive for bonding of the support printed board 5 with the lens holder 18). Both of the bonded parts (two locations) of two support printed boards are same in configuration.

In FIG. 11(b), the adhesive 19a is mounted on the first depression 18a enough to bulge and immediately afterward, the support printed board 5 is pushed onto it in the direction shown by an arrow 20.

By pushing off the support printed board 5, the adhesive 19a extends along the groove.

As a result, as shown in FIG. 11(c), the support printed board 5 is stuck and fixed to the bottom surface of the lens holder.

Further, the adhesive extending along the groove overflows into the corner part defined by the part of the support printed board 5 which protrudes from said lens holder and the side surfaces (front surface and back surface) of said lens holder 18 (the end part of the groove leads up to the corner part).

The overflowed adhesive 19b becomes hardened at the corner part, thereby reinforcing the base of the support printed board and suppressing self-resonance of the support printed board 5.

According to this embodiment, undesired resonance of 6 dB (12 kHz) disappears and high order resonance margin (difference between displacement gain of 1 kHz and peak of high order resonance) is improved from 40 dB to 45 dB.

This promotes tracking performance of the objective lens driving apparatus for the optical data recording medium.

Further, the manufacturing method enables reinforcement of the base of the support printed board without adding any new process.

<<Embodiment 6>>

Figure 12:
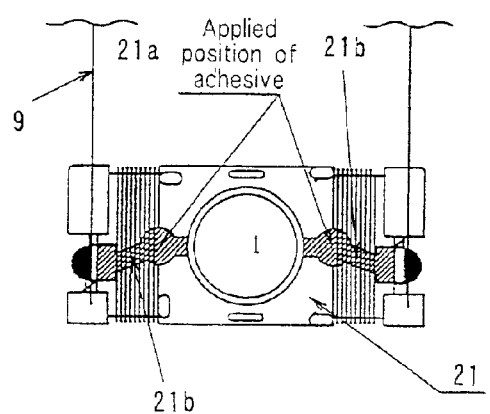
FIG. 12 is a front view of a movable section of the objective lens driving apparatus of embodiment 6.
Figure 13:
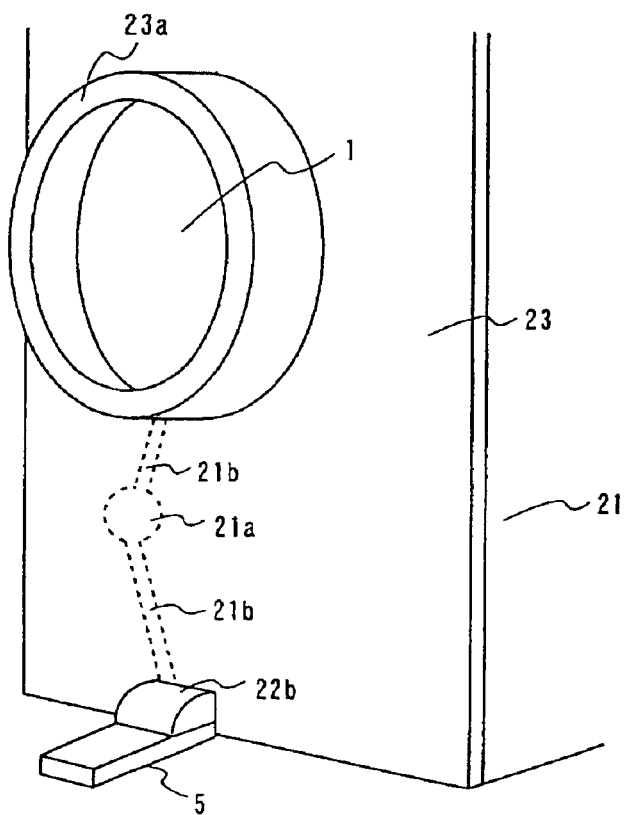
FIG. 13(a) is a perspective view in schematic form depicting the configuration of the reinforcing rib of the objective lens driving apparatus of embodiment 6.
FIG. 13(b) and FIG. 13(c) depict a manufacturing method for manufacturing the objective lens driving apparatus of embodiment 6.
Figure 13:
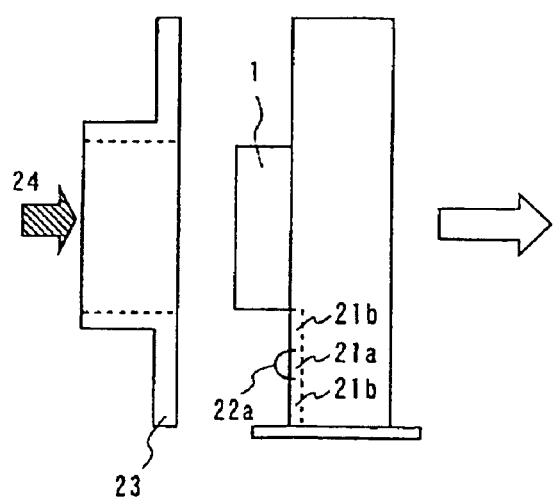
Figure 13:
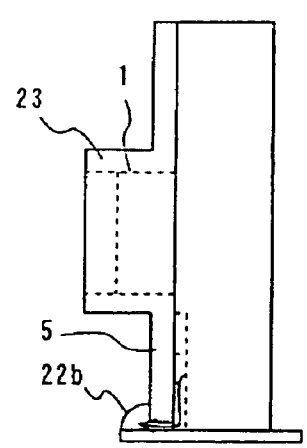
Figure 14:
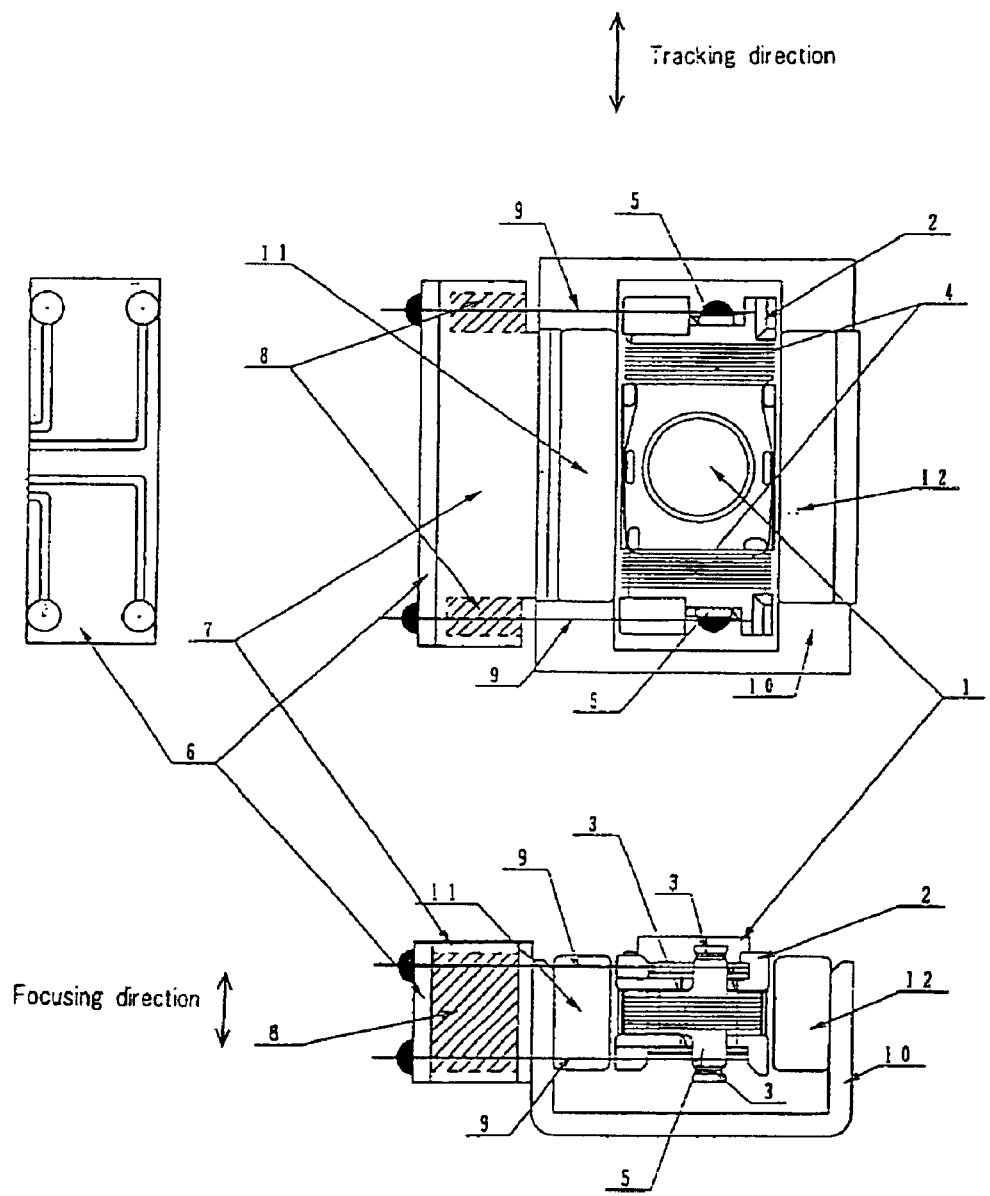
FIG. 14 is a view depicting the configuration of the conventional objective lens driving apparatus.

Referring to FIG. 12 and FIG. 13, an objective lens driving apparatus of embodiment 6 according to the present invention will be explained.

In the objective lens driving apparatus of embodiment 6, an adhesive is applied to the corner part formed by the part of the support printed board 5 which protrudes from said lens holder and the side surface (front surface) of a lens holder 21 in order to suppress self-resonance of the support printed board.

A lens 1 is fitted to the lens holder 21. On the front surface, a second depression 21a and a groove 21b which extends from the second depression 21a to the lens 1 and said corner part, respectively, are formed. (FIG. 12).

The remaining structure of the apparatus is the same as the corresponding structure of the above-mentioned conventional objective lens driving apparatus.

FIG. 12 shows a front view of a movable section of the objective lens driving apparatus of embodiment 6. FIG. 13(a) shows a perspective view in schematic form depicting the configuration of the reinforcing rib of the objective lens driving apparatus of embodiment 6 (The reinforcing rib is represented larger than life.), and FIGS. 13(b) and (c) show the manufacturing method of the objective lens driving apparatus according to the present invention.

The movable section means movable parts held by the suspension wires 9 in the objective lens driving apparatus, including the objective lens 1, the lens holder 21, the focusing coil 3, the tracking coil 4, the support printed boards 5, the suspension wires 9, and a lens protector 23 (The lens protector 23 is shown in FIG. 13).

As parts other than the movable parts are the same as the corresponding parts of the above-mentioned conventional objective lens driving apparatus, description is omitted.

In FIG. 13(b), adhesive 22a is mounted on the second depression 21a enough to bulge and immediately afterward, the lens protector 23 is pushed onto it in the direction shown by an arrow 24.

By pushing off the lens protector 23, the adhesive 22a extends along the groove.

As a result, as shown in FIG. 13(c), the lens protector 23 is stuck and fixed to the front surface of the lens holder.

The adhesive which extends along the groove 21b reaches the circumference of the objective lens 1 so as to fix the objective lens to the lens holder.

Further, the adhesive which extends along the groove 21b overflows into the corner part formed by the part of the support printed board 5 which protrudes from said lens holder and the side surfaces of said lens holder 21 (The end part of the groove leads up to the corner part).

The overflowed adhesive 22b becomes hardened at the corner part, thereby reinforcing the base of the support printed board and suppressing self-resonance of the support printed board 5.

Moreover, in embodiment 6, only the base of the support printed board protruding from the front surface of the lens holder is reinforced. Therefore, with respect to the reinforcement of the base of the support printed board protruding from the back surface of the lens holder, it is desirable to adopt the method in embodiment 5 and so on.

According to this embodiment, undesired resonance of 6 dB (12 kHz) disappears and high order resonance margin (difference between displacement gain of 1 kHz and peak of high order resonance) is improved from 40 dB to 45 dB.

This promotes tracking performance of the objective lens driving apparatus for the optical data recording medium.

The lens protector 23 is made of soft molding material such as DURACON (registered trademark) and tubular part thereof protrudes further forward than the front surface of the lens.

In the case where an optical pickup operates irregularly, the soft lens protector 23 hits against the recording medium, but the objective lens 1 which is located at the position recessed from the front surface of the lens protector does not hit against the recording medium.

The lens protector 23 protects the recording medium and the objective lens 1 from possible breakage in the above-mentioned way. Therefore, the lens protector 23 is useful in itself and it is not a new added component for the purpose of reinforcing the support printed board 5 in the present invention.

The object lens driving apparatus of embodiment 6 has the effect of achieving the object lens driving apparatus with high tracking performance without adding any new component.

Further, by the above-mentioned manufacturing method, the base of the support printed board 5 protruding forward can be reinforced without adding any new process.

According to this invention, the coil restraining part of the support printed board does not cause undesired resonance and unnecessary disturbance in phase, and it is therefore possible to obtain the advantageous effect of achieving the inexpensive and easily manufacturable objective lens driving apparatus with high tracking performance.

Furthermore, according to this invention, it is possible to obtain the advantageous effect of achieving the objective lens driving apparatus in which the starting end and the terminating end of winding of the coil wounded by an automated winder are easy to be restrained.

According to this invention, it is possible to obtain the advantageous effect of achieving the inexpensive manufacturing method of the objective lens driving apparatus with high tracking performance without adding any new manufacturing process.

While preferred embodiments have been described of the invention with a certain degree of particularity, it is understood that the present disclosure of the preferred embodiments have been changed in the details of construction and the varied combination and arrangement of parts may be achieved without departing from the scope and the spirit of the claimed invention.

INDUSTRIAL APPLICABILITY

The objective lens driving apparatus and manufacturing method thereof of the present invention are applicable as the objective lens driving apparatus and its manufacturing method for performing focusing and tracking with respect to optical data recording medium (for example, DVD disc).

What is claimed is:
1. An objective lens driving apparatus comprising:
an objective lens;
a lens holder for holding said objective lens;
a focusing coil having a central axis substantially parallel to a focusing direction of said objective lens;
a tracking coil having a central axis substantially parallel to a tracking direction of said objective lens;
a magnet for generating a magnetic field in the vicinity of said focusing coil and said tracking coil;
a support printed board which protrudes from a side surface of said lens holder and has a restraining part for restraining winding of at least said focusing coil or said tracking coil; and
a plurality of suspension wires made of conductive material,
wherein said lens holder has a reinforcing rib which at least partially contacts a part of said support printed board protruding from said lens holder.
2. c objective lens driving apparatus of claim 1, wherein a surface of said reinforcing rib which is not in contact with a side surface of said lens holder forms an inclined plane with respect to said side surface of said lens holder and winding of said coil which is restrained by at said coil restraining part is located along said inclined plane.
3. The objective lens driving apparatus of claim 2, wherein said support printed board has a plurality of notches and winding of said coil which is restrained at said restraining part is located along said notches.
4. The objective lens driving apparatus of claim 1, wherein said support printed board has a plurality of notches and winding of said coil which is restrained at said restraining part is located along said notches.

* * * * *